United States Patent

Mann et al.

[11] Patent Number: 5,992,145
[45] Date of Patent: Nov. 30, 1999

[54] METHOD AND DEVICE FOR PREVENTING AN INTERRUPTION OF TENSION DURING CONNECTION AND DISCONNECTION OF HYDRAULIC MOTORS

[75] Inventors: Egon Mann; Wolfgang Gebhard, both of Friedrichshafen, Germany

[73] Assignee: ZF Friedrichshafen AG, Friedrichshafen, Germany

[21] Appl. No.: 09/179,347

[22] Filed: Sep. 21, 1998

[30] Foreign Application Priority Data

Nov. 18, 1997 [DE] Germany .............. 197 51 001

[51] Int. Cl.⁶ ................................ F16D 31/00
[52] U.S. Cl. ............... 60/327; 60/425; 60/436; 60/452
[58] Field of Search ............. 60/327, 435, 436, 60/425, 426, 452

[56] References Cited

U.S. PATENT DOCUMENTS

| | | | |
|---|---|---|---|
| 2,398,265 | 4/1946 | Tyler ..................... | 60/425 X |
| 2,996,135 | 8/1961 | Grabow ................... | 60/435 X |
| 3,421,389 | 1/1969 | Fauchere ................. | 60/435 X |
| 5,481,873 | 1/1996 | Saruwatari et al. ........ | 60/452 X |
| 5,560,204 | 10/1996 | Ishihama et al. .......... | 60/426 |

FOREIGN PATENT DOCUMENTS 196 24 531 A1  1/1998  Germany .
196 24 534 A1  1/1998  Germany .

*Primary Examiner*—Hoang Nguyen
*Attorney, Agent, or Firm*—Davis and Bujold

[57] ABSTRACT

The method for preventing the interruption of tension during connection and disconnection of a first hydraulic motor to and from the power train of vehicles, in particular loaders, consists in that during the disconnection of the first hydraulic motor the high-pressure line is connected with the low-pressure line thereof, a flow distributor is readjusted so that the amount of oil fed to the first hydraulic motor is not increased, the pressure on a second hydraulic motor not to be disconnected being raised to a new value which remains constant during the disconnection, of the first hydraulic motor, a pump is readjusted to the new required (reduced) flow rate; and after adjustment of the pump to the new flow rate, the connection of the high-pressure line with the low-pressure line of the first hydraulic motor is eliminated; and during the connection of the hydraulic motor said method steps are carried out in reverse sequence.

7 Claims, 3 Drawing Sheets

METHOD AND DEVICE FOR PREVENTING AN INTERRUPTION OF TENSION DURING CONNECTION AND DISCONNECTION OF HYDRAULIC MOTORS

The invention relates to a method and a device for preventing an interruption of drive torque during connection and disconnection of hydraulic motors to and from the power train of mobile vehicles, particularly loaders.

BACKGROUND OF THE INVENTION

In mobile vehicles the input gears are incrementally actuated with the aid of hydraulic motors. To be able to use pumps having small flow rates at high speeds, it is desirable to disconnect individual hydraulic motors, that is, decouple them from the power train, and reconnect them when necessary. In the disconnected state the hydraulic motors require no oil flow from the pump. The efficiency of the input can thereby be increased, since less moving parts remain in the power train in this disconnected state. The hydraulic motor(s) still remaining in the powertrain take over after disconnection of one hydraulic motor at high speeds and low torque. If the hydraulic motors used are high-speed axial piston motors, the output shaft thereof is connected by a coupling with the power train.

If the hydraulic motors used are externally supported low-speed radial piston motors, their pistons are pressed with rollers into the appertaining cylinders when in the disconnected state.

A hydraulic driving device for a vehicle which in particular is driven by a Diesel engine and has a hydraulic pump actuated by said Diesel engine has been proposed in the applicant's DE-A 196 24 534.6 wherein a hydraulic motor is driven by a hydraulic pump with a variable volume. The pistons are movable along a cam disc situated in the hydraulic motor, there being provided an inner distributor for pressing the pistons in the cylinders of the hydraulic motor. Said distributor is designed so that a definite number of pistons are connected with a first high/low pressure circuit and a definite number of pistons are connected with two separate high/low pressure circuits, both high/low pressure circuits being connected with a tank for the discharge of pressure fluid.

By virtue of the two high-low pressure circuits it is possible to connect with a tank the high-pressure side of the hydraulic pump or the high-pressure side of the respective hydraulic motor whereby disconnected pistons in the hydraulic motor are no longer loaded with low pressure but connected to the almost pressureless tank. During rotation of the hydraulic motor the cams or treads of the cam disc press the disconnected pistons in their cylinders inwardly in direction of the axis of rotation. The pistons thus remain in their inserted position in the cylinders and cause no loss of efficiency, since no hydraulic fluid flows therein and the mechanical friction loss is also eliminated, since the pistons no longer have any contact with the cam disc in this disconnected state.

If during travel of the vehicle, a hydraulic motor, which prior to the disconnection, had an operational displacement above zero, is disconnected, the pump cannot, within the brief period of disconnection, adjust itself to the lower oil volume then needed and the driver will notice a disengagement jerk. When the disconnected hydraulic motor is again connected, the pump cannot adjust itself to the changed situation during the brief switching time, that is, the pump delivers too little oil; the driver will experience an unpleasant engagement jerk.

Therefore, in the applicant's DE-A 196 24 531.1 was already proposed in relation to a hydraulic power device for a vehicle which has an adjustable, motor-driven hydraulic pump in which at least one input unit is actuated, to develop it in the sense of providing at least two hydraulic motors switchable independently of each other and having displacements which can be respectively controlled by means of a hydraulic motor shut-off valve and a displacement shut-off valve interconnected between the latter and the hydraulic motor, wherein during the connection and disconnection of pistons of at least one hydraulic motor the hydraulic pump can be separated from the input unit by a synchronizing valve disposed between the hydraulic pump and the shut-off valves of the hydraulic motor. Engagement jerks during connection and disconnection can be prevented by providing this synchronizing valve. In this arrangement there is, however, an interruption of drive torque during connection and disconnection of the hydraulic motor.

The problem to be solved by this invention is to prevent the interruption of drive torque during connection and disconnection of a hydraulic motor to and from the power train of mobile vehicles by providing a method and a device having an increased efficiency relative to the engagement jerks produced by connection and disconnection.

SUMMARY OF THE INVENTION

According to the invention there is provided a method for preventing the interruption of drive torque during connection and disconnection of a hydraulic motor to and from a power train of mobile vehicles, wherein two motors, one of which is to be connected and disconnected, are supplied with oil by a regulatable pump via a high-pressure line and return oil to the regulatable pump via a low-pressure line, and an electronic control device controls the amount of oil flow, wherein, during disconnection the high-pressure line (10') is connected with the low-pressure line (11') of the one hydraulic motor (1), a flow distributor (5), which supplies the two hydraulic motors (1, 2) with oil, is adjusted by the electronic control device (4) in a manner such that the amount of oil fed to the hydraulic motor (1) to be disconnected is not increased by the pressure drop that occurs therein, but is fed to the hydraulic motor (2) which is not to be disconnected, to provide a pressure increase to this hydraulic motor (2) which is not to be disconnected, to a value.

$$P_2 = P_1 \frac{V_{M2} + V_{M1}}{V_{M2}}$$

where: $P_2$=new pressure,
$P_1$=old pressure,
$V_{M2}$=displacement volume of the not to be disconnected hydraulic motor (2) and
$V_{M1}$=displacement volume of the hydraulic motor (1) to be disconnected,
new pressure $P_2$ during the disconnection being kept constant and the regulatable pump (3) being adjusted by the electronic control device (4) to the reduced flow rate, the flow distributor (5) removing oil from the hydraulic motor (1) to be disconnected and feeding into the hydraulic motor (2) remaining connected to said power train (9); and wherein after adjusting the pump (3) to the new flow rate for supplying the remaining hydraulic motor (2), the connection of the high-pressure line (10') with the low pressure line (11') of the hydraulic motor (1) to be disconnected is eliminated and the hydraulic motor (1) is disconnected from the power train; these method steps being carried out in reverse sequence during reconnection of the disconnected motor (1).

Also according to the invention there is provided a device for carrying out the method according to the preceding paragraph, comprising a regulatable oil pump (3), a hydraulic motor (1) to be disconnected and a hydraulic motor (2) not to be disconnected, which remains permanently connected to a power train (9) of a vehicle driven by the hydraulic motors (1, 2) and an electronic control device (4), wherein the oil pump (3) is connected with the hydraulic motor (1) to be disconnected via a flow distributor (5), controlled by the electric control device (4), and an multi-position spool valve (6) also controlled by said electronic control device (4).

The method and the device according to the invention make possible by the so-called bypass control of the motor, an operation of the hydraulic motor during connection and disconnection which is independent of the flow rate made available by the pump. The regulation of the rates under constant pressure with the aid of the flow distributor results in that, during a gearshift, the vehicle moves forward at the same speed and with the same drive torque. The connection and disconnection of one of the hydraulic motor without interruption of torque makes possible the use of lower flow rates and thus of smaller pumps.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
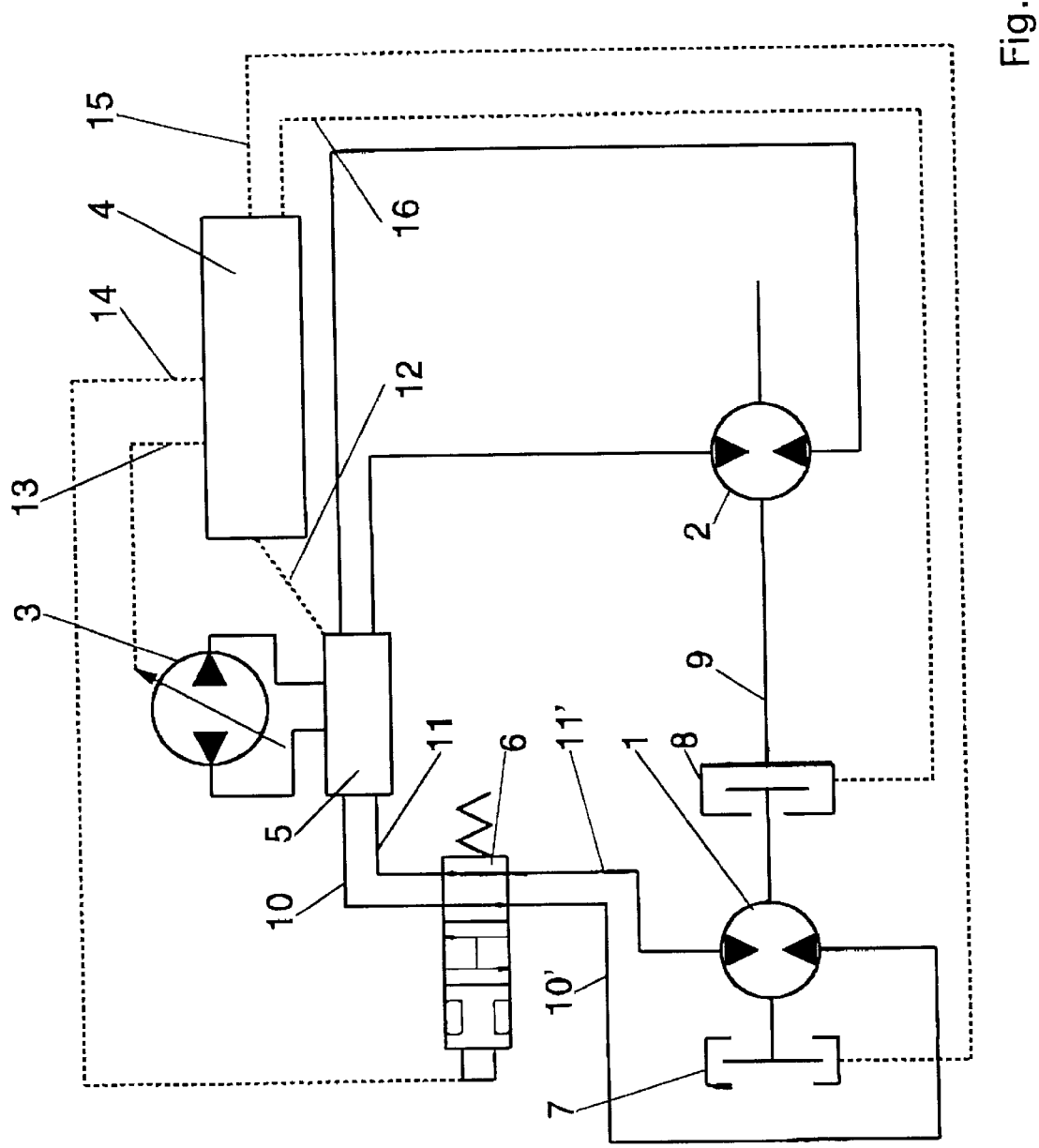
FIG. 1 shows the hydraulic switch diagram prior to disconnection.

The invention is explained with reference to a mobile vehicle having two hydraulic motors having a single power train in which, during gearshifts, one of the hydraulic motors is disconnected and later reconnected while the other hydraulic motor remains permanently in the power train.

In the figures, 1 designates the hydraulic motor to be connected or disconnected, 2 the first hydraulic motor permanently remaining in the power train 9 and a regulatable pump 3. The second hydraulic motor 1 to be connected or disconnected is provided with a brake 7 and is connected by a clutch 8 with the vehicle power train 9 which is jointly driven by both hydraulic motors 1, 2 when the clutch 8 is engaged.

A flow distributor 5 is connected with the pump 3 and has a high-pressure line 10 and low-pressure line 11 connected with the hydraulic motor 1 by a multi-position spool valve 6.

An electronic control device 4 is connected by a first connection 12 with the flow distributor 5, by a second connection 13 with the regulatable pump 3, by a third connection 14 with the multi-position valve spool 6, by a fourth connection 15 with the brake 7 coordinated with the hydraulic motor 1 and by a fifth connection 16 with the clutch 8 by which the motor 1 is connected with the power train 9.

FIG. 1 shows the hydraulic status prior to the start of disconnection of the hydraulic motor 1, which in the embodiments shown is a high-speed axial piston motor. Prior to introducing the disconnection, the hydraulic motor 1 is connected, via a high-pressure line 10' and the multi-position spool valve 6, with a high-pressure line 10 of the flow distributors and by a low-pressure line 11', via the multi-position spool valve 6 and a low-pressure line 11 to the flow distributor 5.

Figure 2:
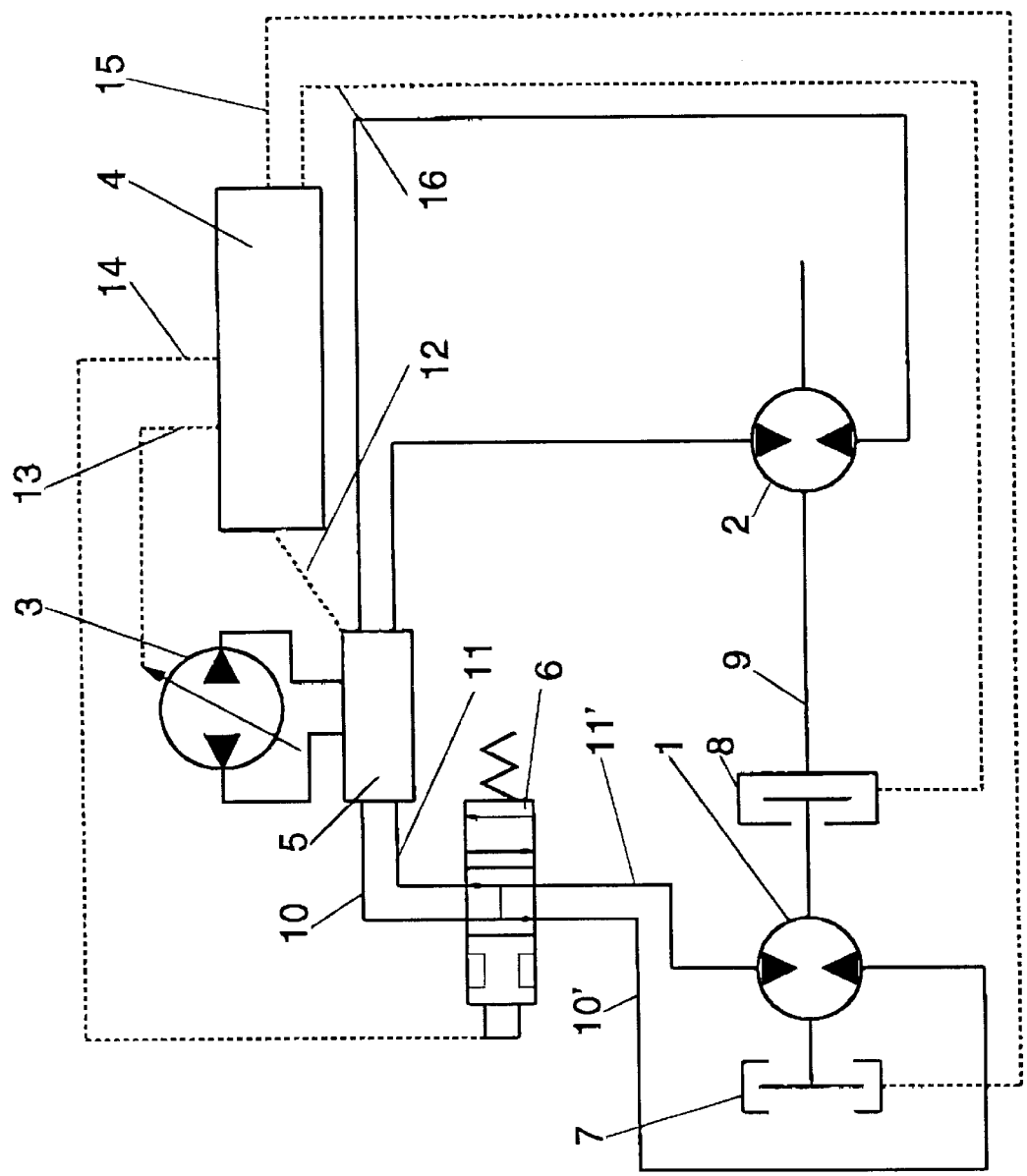
FIG. 2 shows the hydraulic switch diagram during disconnection.

During disconnection (FIG. 2) the high-pressure line 10' of the hydraulic motor 1 is connected by means of the multi-position spool valve 6 with its low-pressure line 11'. In this position of the multi-position spool valve 6, the flow distributor 5 is adjusted such that the oil rate, flowing to the hydraulic motor 1 to be disconnected, does not increase due to the pressure drop in the hydraulic motor 1. This is made possible by the fact that the pressure, measured on the high pressure of the hydraulic motor 2 remaining in the power train, is regulated by the flow distributor 5 in a manner such that the pressure is increased to a new value during the disconnection.

The new value is calculated according to the formula $$P_2 = P_1 \frac{V_{M2} + V_{M1}}{V_{M2}}$$

wherein: $P_2$ is the new pressure,
$P_1$ is the pressure prior to start of disconnection,
$V_{M2}$ is the displacement volume of the hydraulic motor 2 remaining in the power train and
$V_{M1}$ is the displacement volume of the hydraulic motor 1 to be disconnected.

The raised pressure $P_2$ is kept constant during the disconnection until the disconnection is complete. Thereby the vehicle experiences during disconnection the same drive torque as prior thereto.

The pump 3 is then adjusted to the appropriate reduced flow rate by the electronic control device 4. The amount of oil which the driving hydraulic motor 2 would not miss is removed by the flow distributor 5 to the hydraulic motor 1 to be disconnected, since the pressure has been kept constant by the flow distributor 5 during the switching. The amount of oil which the disconnected hydraulic motor 1 now lacks, said motor receives via its interconnected high-pressure and low-pressure lines.

Figure 3:
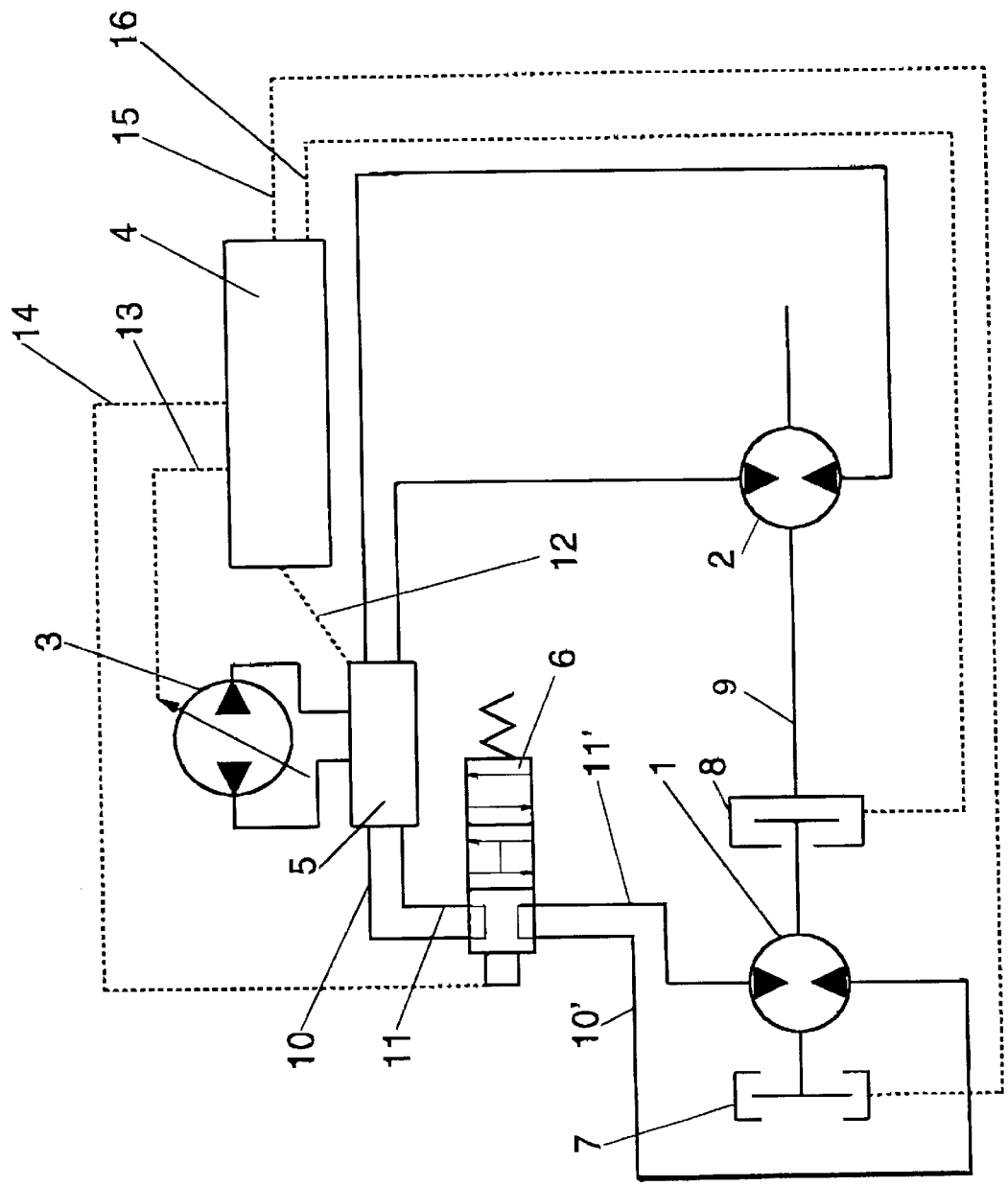
FIG. 3 shows the hydraulic switch diagram after disconnection.

When the pump 3 has reached its new flow rate (which is known prior to introducing the disconnection and corresponds to the displacement volume of the hydraulic motor 1), then the hydraulic motor 1 becomes completely separated from the high pressure and from the low pressure by means of the multi-position spool valve 6 and thus disconnected from the power train 9 (FIG. 3).

With the reading of the new flow rate of the pump 3, the oil flow from the flow distributor 5 to the hydraulic motor 1 to be disconnected is almost zero, as now the hydraulic motor 2 remaining in the powertrain 9 needs the full flow rate of the pump 3.

Prior to disconnection of the hydraulic motor 1, the brake 7 controlled by the electronic control device 4 is opened and the clutch 8 coordinated therewith likewise controlled by the electronic control device 4, is closed. After disconnection the brake 7 is closed and the clutch 8 opened. By the invention, any engagement jerk due to an undesired pressure rise resulting from an inadmissible increase of the amount of oil delivered by the pump to the motor is prevented.

The hydraulic motor used in the drawing is an axial piston motor which is connected with or separated from the power train 9 by means of the clutch 8; if instead of this hydraulic motor an externally supported radial piston motor is used, the clutch and brake are eliminated and the separation from the power train 9 is effected in the traditional way by the pressing the pistons.

When the disconnected hydraulic motor 1 is connected again, the same method steps are carried out in inverse sequence. Consequently, the hydraulic motor 1, including the bypass valve, is first connected to the power train 9 by means of the clutch 8 (or of the low pressure in a radial piston motor). At this stage the flow distributor 5 still does not supply oil to the hydraulic motor 1 to be connected. The flow rate of the pump 3 is now increased and this added amount is made available to the hydraulic motor 1 via the flow distributor 5 and the multi-position spool valve 6. The pressure is here keep constant, that is, not reduced. After reaching the desired flow rate the bypass is disconnected and the hydraulic motor 1 again directly connected with the high-pressure line and the low-pressure line. Thereafter the pressure constant regulation of the flow distributor 5 is disconnected, so that even here the vehicle undergoes no engagement jerk due to connection of the hydraulic motor 1.

The electronic control device 4 can be optionally provided with an automatic gearshift which within a specific pressure and speed range induces the connection or disconnection. Unsuitable gearshift operations also can be prevented, for example, the disconnection of a hydraulic motor under a preset very elevated high pressure whereby the disconnection would have as consequence a pressure increase going above the admissible pressure values of the device.

Reference numerals 1 hydraulic motor
2 hydraulic motor
3 hydraulic pump
4 electronic control device
5 flow distributor
6 multi-position spool valve
7 brake
8 coupling (clutch)
9 drive train
10' high-pressure line
11' low-pressure line
12 first connection
13 second connection
14 third connection
15 fourth connection
16 fifth connection
$P_1$ old pressure
$P_2$ new pressure
$V_{M1}$ displacement volume of the motor to be disconnected
$VM_2$ displacement volume of the unconnected motor

We claim:

1. A method for preventing an interruption in drive torque when one of connecting and disconnecting a hydraulic motor to and from a power train of a vehicle having two hydraulic motors with a first of said two hydraulic motors being selectively connectable and disconnectable from the power train while a second of said two hydraulic motors being permanently connected to the power train, both of said two hydraulic motors being connected with a regulatable pump (3) for receiving hydraulic fluid, via a high-pressure line, and both of said two hydraulic motors being connected with the regulatable pump (3) for returning hydraulic fluid thereto via a low-pressure line;

an electronic control device (4) being coupled for controlling a flow rate of hydraulic fluid to both of said two hydraulic motors and, during disconnection of the first of said two hydraulic motors from the power train, the high-pressure line (10') of the first of said two hydraulic motors (1) being connected with the low-pressure line (11') of the first of said two hydraulic motors (1); and a flow distributor (5) being connected to supply both of said two hydraulic motors (1, 2) with hydraulic fluid from said regulatable pump (3), said flow distributor (5) being controlled by the electronic control device (4);

the method comprising, during disconnection of the first of said two hydraulic motors (1), the steps of:

preventing the flow rate of hydraulic fluid supplied to the first of said two hydraulic motors (1) from increasing by any pressure drop occurring in the first of said two hydraulic motors (1) but increasing the flow rate of hydraulic fluid supplied to the second of said two hydraulic motors (2) to a new pressure value determined by the formula:

$$P_2 = P_1 \frac{V_{M2} + V_{M1}}{V_{M2}}$$

where: $P_2$=new pressure, $P_1$=old pressure prior to disconnection, $V_{M2}$=a displacement volume of the second of said two hydraulic motors (2); and $V_{M1}$=a displacement volume of the first of said two hydraulic motors (1);

maintaining the new pressure $P_2$, at a constant pressure, and adjusting the regulatable pump (3) by the electronic control device (4) to a reduced flow rate;

removing, via the flow distributor (5), hydraulic fluid from the first of said two hydraulic motors (1) and supplying the removed hydraulic fluid to the second of said two hydraulic motors (2);

eliminating the connection between the high-pressure line (10') and the low pressure line (11') of the first of said two hydraulic motors (1), after adjusting the regulatable pump (3) to the new reduced flow rate; and disconnecting the first of said two hydraulic motors (1) from the power train.

2. The method according to claim 1, further comprising the steps of:

connecting the first of said two hydraulic motors (1) to the power train;

establishing a connection between the high-pressure line (10'), of the first of said two hydraulic motors (1), with the low pressure line (11') of the first of said two hydraulic motors (1);

adjusting the regulatable pump (3) by the electronic control device (4) to an increased flow rate;

reestablishing the connecting between the high-pressure line of the first of said two hydraulic motors (1) with the regulatable pump (3) and the low-pressure line of the first of said two hydraulic motors (1) with the regulatable pump (3); and supplying hydraulic fluid to the first of said two hydraulic motors (1).

3. The method according to claim 1, further comprising the steps of using an axial piston motor as the first of said two hydraulic motors (1), providing the hydraulic motor (1) with a brake (7) for stopping rotating of the first of said two hydraulic motors (1), and providing a clutch (8) for forming a connection between the first of said two hydraulic motors (1) with the power train of the vehicle.

4. The method according to claim 1, further comprising the steps of using an externally supported radial piston motor as the first of said two hydraulic motors (1), and providing the externally supported radial piston motor with rollers which, upon disconnection, forcing associated pistons into appertaining cylinders.

5. A device for preventing an interruption in drive torque when one of connecting and disconnecting a hydraulic motor to and from a powertrain of a vehicle, said vehicle having two hydraulic motors with a first of said two hydraulic motors being selectively connectable and disconnectable from the power train while a second of said two hydraulic motors being permanently connected to the power train, both of said two hydraulic motors being connected with a regulatable pump (3) for receiving hydraulic fluid, via a high-pressure line, and both of said two hydraulic motors being connected with the regulatable pump (3) for returning hydraulic fluid thereto via a low-pressure line;

an electronic control device (4) being coupled for controlling a flow rate of hydraulic fluid to both of said two hydraulic motors and, during disconnection of the first of said two hydraulic motors from the powertrain, the high-pressure line (10') of the first of said two hydraulic motors (1) being connected with the low-pressure line (11') of the first of said two hydraulic motors (1); and a flow distributor (5) being connected to supply both of said two hydraulic motors (1, 2) with hydraulic fluid from said regulatable pump (3), said flow distributor (5) being controlled by the electronic control device (4);

a multi-position spool valve (6) being controlled by said electronic control device (4) for controlling the flow of hydraulic fluid to the first of said two hydraulic motors (1);

wherein, during disconnection of the first of said two hydraulic motors (1), the the flow rate of hydraulic fluid supplied to the first of said two hydraulic motors (1) is prevented from increasing by any pressure drop occurring in the first of said two hydraulic motors (1) but the flow rate of hydraulic fluid supplied to the second of said two hydraulic motors (2) is increased to a new pressure value determined by the formula:

$$P_2 = P_1 \frac{V_{M2} + V_{M1}}{V_{M2}}$$

where: $P_2$=new pressure, $P_1$=old pressure prior to disconnection, $V_{M2}$=a displacement volume of the second of said two hydraulic motors (2); and $V_{M1}$=a displacement volume of the first of said two hydraulic motors (1);

the new pressure $P_2$ is maintained at a constant pressure and the regulatable pump (3) is adjusted by the electronic control device (4) to a reduced flow rate;

hydraulic fluid is removed from the first of said two hydraulic motors (1), via the flow distributor (5), and the removed hydraulic fluid is supplied to the second of said two hydraulic motors (2);

the connection between the high-pressure line (10') and the low pressure line (11') of the first of said two hydraulic motors (1) is removed after adjusting the regulatable pump (3) to the new reduced flow rate; and the first of said two hydraulic motors (1) is disconnected from the power train.

6. The device according to claim 5, wherein the first of said two hydraulic motors (1) is an axial piston motor, the axial piston motor is provided with a brake (7) for stopping rotating of the first of said two hydraulic motors (1), and the first of said two hydraulic motors (1) is provided with a clutch (8) for forming a connection between the first of said two hydraulic motors (1) with the power train of the vehicle, and both the brake (7) and the clutch (8) are coupled to the electronic control device (4).

7. The device according to claim 5, wherein the first of said two hydraulic motors (1) is a radial piston motor, and the externally supported radial piston motor is provided with rollers which, upon disconnection, force associated pistons into appertaining cylinders.

* * * * *